(12) United States Patent
Ikeda et al.

(10) Patent No.: US 10,054,307 B2
(45) Date of Patent: Aug. 21, 2018

(54) COMMUNICATION DEVICE AND AIR-CONDITIONING APPARATUS

(71) Applicant: Mitsubishi Electric Corporation, Tokyo (JP)

(72) Inventors: Hisanori Ikeda, Tokyo (JP); Masato Ishikawa, Tokyo (JP); Akimoto Suzuki, Tokyo (JP); Masahide Kinami, Tokyo (JP); Youhei Koyanagi, Tokyo (JP); Takuya Goto, Tokyo (JP); Katsuya Ishigami, Tokyo (JP); Shinji Kawai, Tokyo (JP); Yosuke Naito, Tokyo (JP); Kiyoshi Yasutomi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 346 days.

(21) Appl. No.: 14/691,653

(22) Filed: Apr. 21, 2015

(65) Prior Publication Data

US 2016/0025328 A1    Jan. 28, 2016

(30) Foreign Application Priority Data

Jul. 25, 2014   (JP) ................................. 2014-151945

(51) Int. Cl.
    *F21V 33/00*        (2006.01)
    *H04Q 1/02*         (2006.01)
    (Continued)

(52) U.S. Cl.
    CPC .......... *F21V 33/0092* (2013.01); *F21V 15/01* (2013.01); *G02B 6/0001* (2013.01); *H04Q 1/023* (2013.01)

(58) Field of Classification Search
    CPC .. F21V 15/01; F21V 33/0092; F21Y 2101/02; F21Y 2103/003; H04Q 1/023;
    (Continued)

(56) References Cited

U.S. PATENT DOCUMENTS

| | | | |
|---|---|---|---|
| 5,815,225 A * | 9/1998 | Nelson ................. | G06F 1/1637 349/1 |
| 2012/0012297 A1* | 1/2012 | Nakagawa ........... | F24F 11/0012 165/247 |
| 2012/0035781 A1* | 2/2012 | Archibald .......... | H05K 7/20745 700/300 |

FOREIGN PATENT DOCUMENTS

| | | |
|---|---|---|
| CN | 102338446 A | 2/2012 |
| CN | 203365450 U | 12/2013 |

(Continued)

OTHER PUBLICATIONS

Extended European Search Report dated Dec. 9, 2015 issued in corresponding EP patent application No. 15165145.2.
(Continued)

*Primary Examiner* — Elmito Breval
*Assistant Examiner* — Omar Rojas Cadima
(74) *Attorney, Agent, or Firm* — Posz Law Group, PLC (57) ABSTRACT

A communication device constitutes part of an apparatus and communicates with other apparatuses. The communication device includes a case having an opening; a plurality of indicator lamps accommodated in the case, at a position corresponding to the opening; and an indicator lamp cover that is provided so as to be slidable in a direction in which the plurality of indicator lamps are arranged and that is used to adjust an opening degree of the opening.

15 Claims, 7 Drawing Sheets

(51) Int. Cl.
*F21V 15/01* (2006.01)
*F21V 8/00* (2006.01)

(58) Field of Classification Search
CPC ........... H04M 1/22; H01H 9/161; H01H 3/12;
G02B 6/0001; G01D 3/00; G01D 7/00;
G12B 11/00
USPC ............... 362/23.01, 96, 23.04, 23.05, 23.06
See application file for complete search history.

(56) References Cited

FOREIGN PATENT DOCUMENTS

| | | |
|---|---|---|
| JP | 2005-316751 A | 11/2005 |
| JP | 2009-196137 A | 9/2009 |

OTHER PUBLICATIONS

Office Action dated Apr. 4, 2017 issued in corresponding JP patent application No. 2014-151945 (and English translation).
Office Action dated Jan. 22, 2018 issued in corresponding CN patent application No. 201510282626.0 (and English translation).

* cited by examiner

COMMUNICATION DEVICE AND AIR-CONDITIONING APPARATUS

TECHNICAL FIELD

The present invention relates to a communication device and an air-conditioning apparatus.

BACKGROUND ART

In recent years, there are growing demands for achieving improved energy management, convenience, energy efficiency, etc. by introducing home energy management systems (HEMS), smart grids, etc. in office buildings, hotels, houses, etc. to perform remote control and centralized management control of apparatuses.

Wi-Fi communications are becoming widely available in office buildings, hotels, houses, etc. mainly in Europe and North America. Wi-Fi compatible portable terminals are also rapidly becoming widely available, and demands for controlling apparatuses using portable terminals etc. are expected to increase in the future.

Conventionally, communication devices that connect between an apparatus and an apparatus are known (see Patent Literature 1). A communication device in Patent Literature 1 includes a rotatable cover. By rotating the cover, an indicating state in which all indicator lamps are exposed and a non-indicating state in which all the indicator lamps are covered can be switched. The communication device in Patent Literature 1 is turned to the non-indicating state, in which all the indicator lamps are covered, when there is no need to check communication status, etc., thereby preventing lighting and flashing of the indicator lamps from disturbing the eyes.

CITATION LIST

Patent Literature

[PTL 1] Japanese Unexamined Patent Application Publication No. 2005-316751 (P3, FIG. 1)

SUMMARY OF INVENTION

Technical Problem

However, because the communication device in Patent Literature 1 is not designed to be installed in an apparatus, if it is simply applied to an apparatus, for example, specific problems may occur. For example, when the communication device in Patent Literature 1 is mounted to an apparatus, it may be difficult to rotate the cover. In such a case, if the indicating state, in which all the indicator lamps are exposed, is maintained, the indication disturbs the eyes, and, if the non-indicating state, in which all the indicator lamps are covered, is maintained, the necessary indication cannot be checked.

The present invention has been made in view of the problems as above, and an object thereof is to provide a communication device in which it is possible to cover part of a plurality of indicator lamps, while exposing the indicator lamp other than the covered indicator lamp, and to provide an air-conditioning apparatus.

Solution to Problem

A communication device of the present invention is characterized in that it constitutes part of an apparatus and communicates with other apparatuses, the communication device including: a case having an opening; a plurality of indicator lamps accommodated in the case, at a position corresponding to the opening; and an indicator lamp cover that is provided so as to be slidable in a direction in which the plurality of indicator lamps are arranged and that adjusts an opening degree of the opening.

Advantageous Effects of Invention

In the communication device of the present invention, because the indicator lamp cover is provided so as to be slidable in the direction in which the plurality of indicator lamps are arranged, it is possible to cover part of the plurality of indicator lamps, while exposing the indicator lamp other than the covered indicator lamp. As a result, the communication device of the present invention can perform an appropriate indication according to the type and installation site of the apparatus, as well as the installation position of the communication device, when it is mounted to the apparatus and constitutes part of the apparatus.

DESCRIPTION OF EMBODIMENTS

Embodiments of the present invention will be described below with reference to the drawings. Note that, in the respective drawings, same or corresponding parts will be denoted by same reference signs, and descriptions thereof will be omitted or simplified. Furthermore, the shape, the size, the arrangement, etc. of the configurations shown in the respective drawings may be appropriately changed within a scope of the present invention.

Embodiment 1

Figure 1:
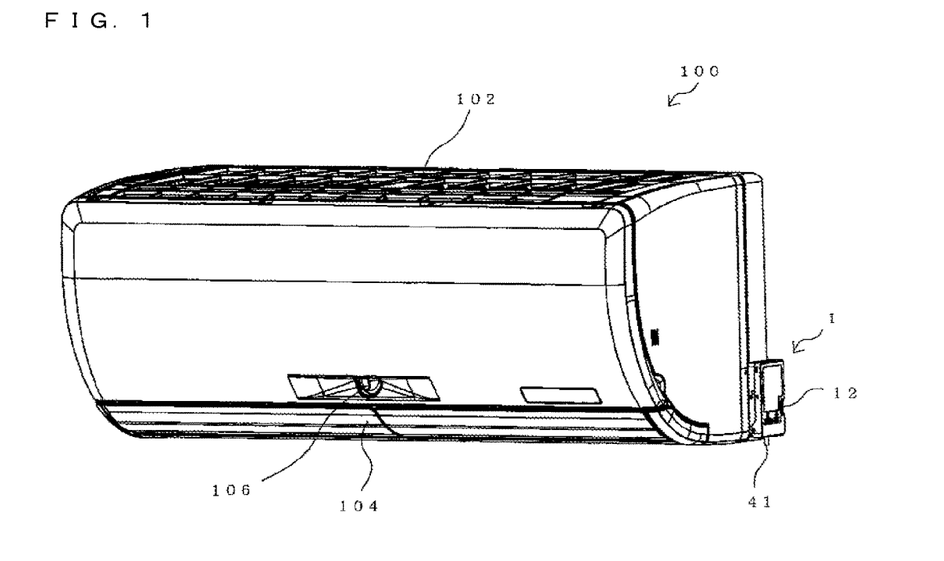
FIG. 1 is a perspective view showing an example of an air-conditioning apparatus on which a communication device according to Embodiment 1 of the present invention is provided.
Figure 2:
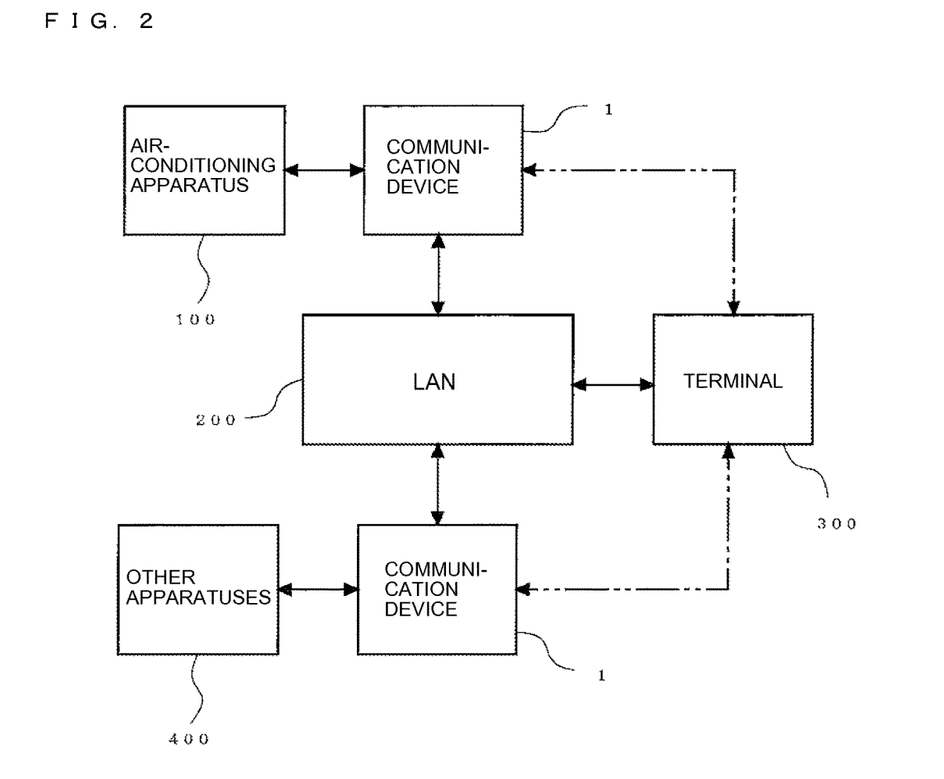
FIG. 2 is a schematic diagram of a network to which the air-conditioning apparatus shown in FIG. 1 is connected.

FIG. 1 is a perspective view showing an example of an air-conditioning apparatus on which a communication device according to Embodiment 1 of the present invention is provided, and FIG. 2 is a schematic diagram of a network to which the air-conditioning apparatus shown in FIG. 1 is connected. As shown in FIGS. 1 and 2, a communication device 1 according to Embodiment 1 constitutes part of an air-conditioning apparatus 100 and communicates with a terminal 300, other apparatuses 400, etc. Note that, as shown in FIG. 2, the communication device 1 may constitute part of the other apparatus 400 and communicate with the terminal 300, the air-conditioning apparatus 100, etc. Examples of the other apparatus 400 include electric appliances, such as a refrigerator, a washing machine, and a lighting apparatus, that are provided in a home.

As shown in FIG. 2, the air-conditioning apparatus 100 is connected to a local area network (LAN) 200 via the communication device 1 and can communicate with the terminal 300, the other apparatuses 400, etc. The terminal 300 is, for example, a smart phone, a personal computer, or the like that can connect to the LAN 200. A user can send and receive data to and from the air-conditioning apparatus 100 by using the terminal 300.

For example, the user can remote control the air-conditioning apparatus 100 and can manage the power consumption of the air-conditioning apparatus 100 by using the terminal 300. Although the LAN 200 is a wireless LAN, such as Wi-Fi, it may be a wired LAN or a network that includes both a wireless LAN and a wired LAN. Furthermore, the communication device 1 may have a function that can directly send and receive data to and from the terminal 300 without using the LAN 200.

As shown in FIG. 1, the air-conditioning apparatus 100 is mounted to, for example, an indoor wall to air-condition an air-conditioning target space. The air-conditioning apparatus 100 has an air inlet 102 at the top and an air outlet 104 at the bottom in the front. Inside the air-conditioning apparatus 100 are provided a fan, a heat exchanger, etc. (not shown). Indoor air taken in from the air inlet 102 exchanges heat with the heat exchanger (not shown) and is blown out, as air-conditioned air, from the air outlet 104.

The air-conditioning apparatus 100 is provided with, in the front side thereof, a detection unit 106 that detects the state of the room. The detection unit 106 is configured to include an infrared sensor for sensing the indoor temperature, a motion sensor for sensing the position of a person in the room, etc. Furthermore, the communication device 1 is disposed on the side surface (light side surface in the figure) of the air-conditioning apparatus 100.

The communication device 1 is removably attached to the back surface of the side surface of the air-conditioning apparatus 100, such that indicator lamps 12 face the side. Note that the communication device 1 may be fixed to the air-conditioning apparatus 100 or may be disposed inside a housing of the air-conditioning apparatus 100. The indicator lamps 12 indicate the communication status, etc. of the communication device 1. The communication device 1 is attached to the air-conditioning apparatus 100 by, for example, engaging a hook (not shown) formed on one of the communication device 1 and the air-conditioning apparatus 100 and a catch (not shown) formed on the other. The communication device 1 may alternatively be attached to the air-conditioning apparatus 100 by using a hook-and-loop fastener, a binding band, or the like.

Note that the communication device 1 is attached to the air-conditioning apparatus 100, at a position where it does not inhibit the functions of the components of the air-conditioning apparatus 100, such as the air inlet 102, the air outlet 104, and the detection unit 106. Alternatively, the communication device 1 may be attached to a wall near the air-conditioning apparatus 100.

Furthermore, the communication device 1 may be disposed such that the indicator lamps 12 face a direction different from the direction in which the air-conditioned air is blown out of the air outlet 104 in the air-conditioning apparatus 100. By making the indicator lamps 12 face a direction different from the direction in which the air-conditioned air is blown out of the air outlet 104 in the air-conditioning apparatus 100, entry of light emitted from the indicator lamps 12 directly into the eyes of the user is suppressed. As a result, it is possible to reduce the disturbing effects of the indication of the indicator lamps 12.

Furthermore, the communication device 1 has a connecting cable 41 extending from the bottom thereof. By connecting the connecting cable 41 to a controller (not shown) of the air-conditioning apparatus 100, communication between the communication device 1 and the air-conditioning apparatus 100 is enabled.

Figure 3:
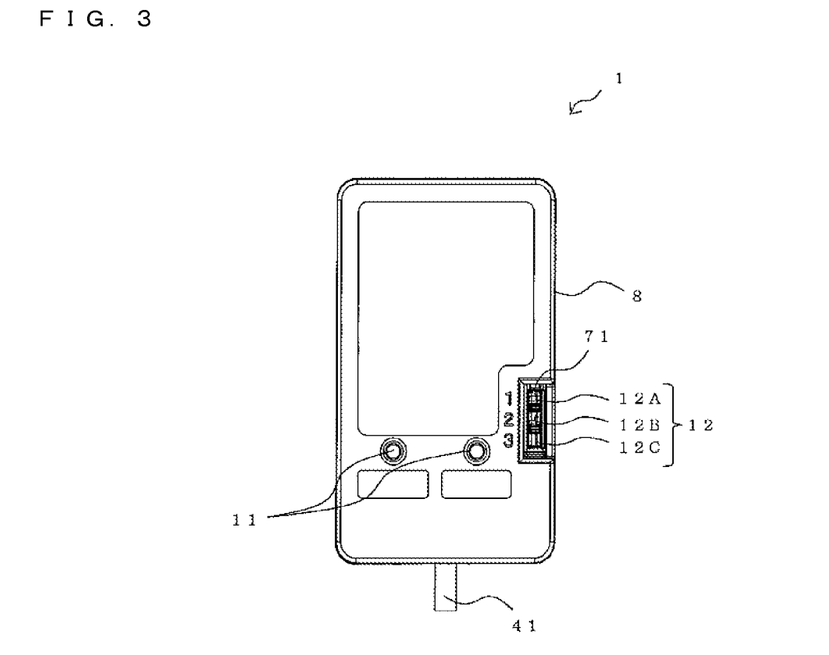
FIG. 3 is a front view of the communication device shown in FIG. 1 (an opening is in a fully open state).
Figure 4:
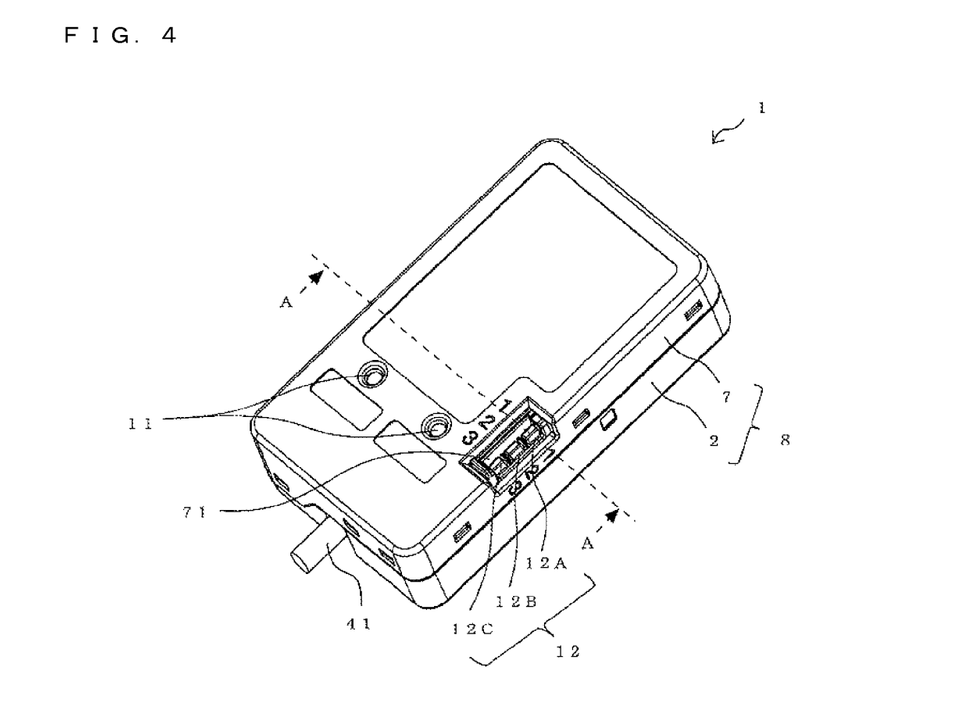
FIG. 4 is a perspective view of the communication device shown in FIG. 3 (the opening is in the fully open state).
Figure 5:
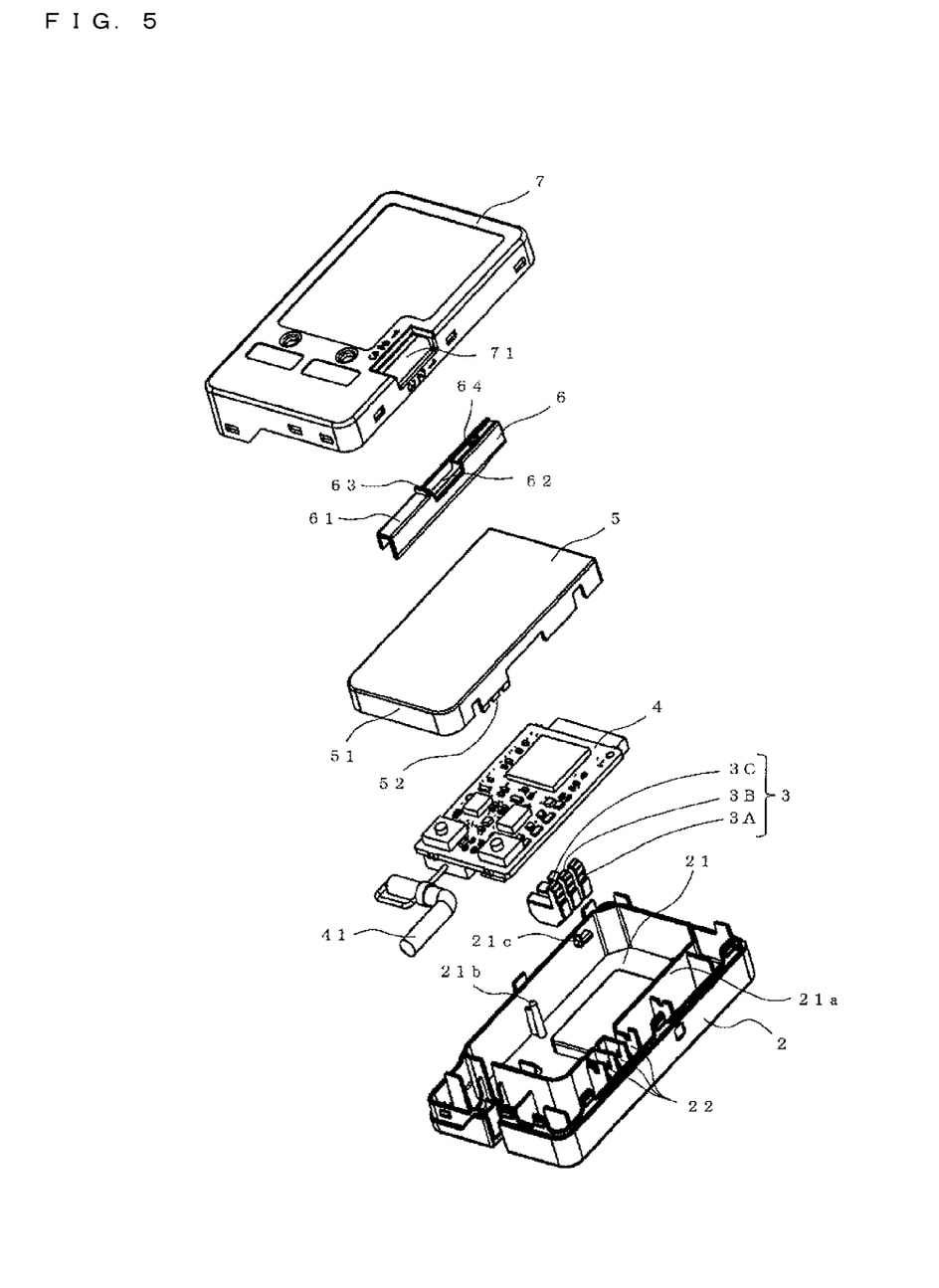
FIG. 5 is an exploded perspective view of the communication device shown in FIG. 4.
Figure 6:
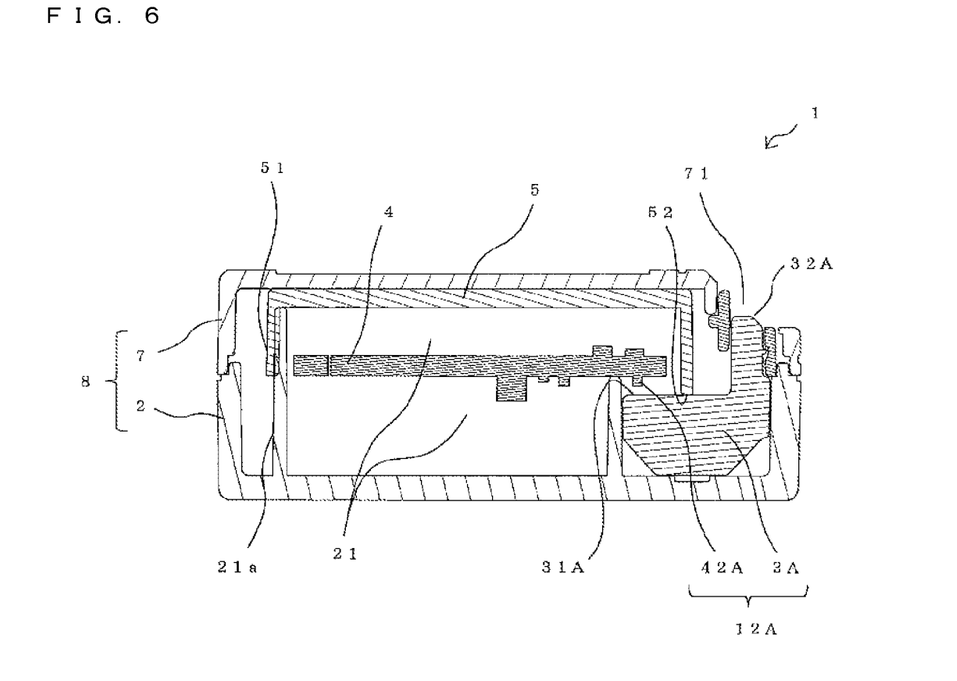
FIG. 6 is a sectional view taken along line A-A in FIG. 4.

FIG. 3 is a front view of the communication device shown in FIG. 1, FIG. 4 is a perspective view of the communication device shown in FIG. 3, FIG. 5 is an exploded perspective view of the communication device shown in FIG. 4, and FIG. 6 is a sectional view taken along line A-A in FIG. 4. As shown in FIG. 3, the communication device 1 includes a case 8, manipulating portions 11, and the indicator lamps 12. The manipulating portions 11 are formed of, for example, a plurality of push-button switches. The user can, for example, reset the communication device 1 or configure encryption settings on the communication device 1 by manipulating the manipulating portions 11.

The indicator lamps 12 according to Embodiment 1 include indicator lamps 12A to 12C. The indicator lamp 12A indicates, for example, the error status of the communication device 1, the indicator lamp 12B is used to indicate, for example, the communication status between the communication device 1 and the air-conditioning apparatus 100, and the indicator lamp 12C indicates, for example, the communication status between the communication device 1 and the wireless LAN. Note that the indicator lamps 12 may be configured to include two indicator lamps, or four or more indicator lamps.

As shown in FIG. 4, the case 8 is formed of a lower case 2 and an upper case 7. The upper case 7 is provided with an opening 71, and the indicator lamps 12A to 12C are accommodated in the case 8, at a position corresponding to the opening 71. As shown in FIGS. 5 and 6, a plurality of light guide portions 3, an electrical circuit substrate 4, an inner case 5, and an indicator lamp cover 6 are accommodated in the case 8.

The lower case 2 is formed of a resin material, such as polycarbonate (PC) or a polyphenylene sulfide (PPS), and has a substrate accommodating portion 21 and a plurality of communication portions 22. The substrate accommodating portion 21 is an accommodating portion that accommodates the electrical circuit substrate 4 and is surrounded by an inner wall 21a. The substrate accommodating portion 21 is provided with a plurality of carry portions 21b (FIG. 5 shows only one of them) on which the electrical circuit substrate 4 is placed, and a projection 21c that prevents the electrical circuit substrate 4 placed on the carry portions 21b from being displaced. Each of the plurality of communication portions 22 is formed so as to communicate between the substrate accommodating portion 21 and the opening 71. Each of the plurality of communication portions 22 will accommodate the corresponding one of light guide portions 3A to 3C.

As shown in FIG. 6, the light guide portion 3A guides light emitted from a light-emitting portion 42A toward the opening 71. The light guide portion 3A is formed in a substantially L shape in section, including a light entering portion 31A and a lighting portion 32A, and formed of a translucent material, such as polymethylmethacrylate (PMMA) or a polycarbonate (PC). The light entering portion 31A is located in the substrate accommodating portion 21, at a position away from the light-emitting portion 42A so as to face the light-emitting portion 42A. The lighting portion 32A is located outside the substrate accommodating portion 21 and is exposed from the case 8 at the opening 71. The light emitted from the light-emitting portion 42A enters the light entering portion 31A and is radiated from the lighting portion 32A. Note that, because the light guide portions 3B and 3C have the same configuration as the light guide portion 3A, descriptions of the light guide portions 3B and 3C will be omitted for the ease of understanding Embodiment 1.

As shown in FIG. 5, the electrical circuit substrate 4 controls the entirety of the communication device 1 and is provided with electric components, such as resistors, capacitors, and ICs. The electrical circuit substrate 4 is also provided with the connecting cable 41 and the light-emitting portion 42A (see FIG. 6). The connecting cable 41 is led out of the bottom of the case 8 to be connected to the air-conditioning apparatus 100.

The light-emitting portion 42A is formed of a light-emitting device, such as an LED, and emits light according to the communication status of the communication device 1. The light-emitting portion 42A is provided away from the light guide portions 3A and emits light toward the light guide portion 3A. The light emitted from the light-emitting portion 42A passes through the light guide portion 3A and is guided toward the opening 71. Although FIG. 6 shows only the light-emitting portion 42A, there are a plurality of light-emitting portions in practice. In Embodiment 1, the light-emitting portions 42B and 42C (not shown) are provided on the electrical circuit substrate 4.

As shown in FIG. 6, the indicator lamp 12A according to Embodiment 1 is configured to include the light guide portion 3A and the light-emitting portion 42A. The light-emitting portion 42A disposed in the substrate accommodating portion 21 emits light toward a direction different from the direction in which the opening 71 is located, and the light emitted from the light-emitting portion 42A enters the light entering portion 31A of the light guide portion 3A. The light entering the light guide portion 3A is guided toward the opening 71 and is emitted from the lighting portion 32A. Note that the indicator lamp 12B includes the light guide portion 3B and the light-emitting portion 42B (not shown), and the indicator lamp 12C includes the light guide portion 3C and the light-emitting portion 42C (not shown), and the indicator lamps 12B and 12C have the same configuration as the indicator lamp 12A. Hence, descriptions of the configuration of the indicator lamps 12B and 12C will be omitted for the ease of understanding Embodiment 1.

The inner case 5 is formed of an elastic resin material and has a flange portion 51. The inner case 5 is attached to the lower case 2 such that the flange portion 51 is fitted to the outer side of the inner wall 21a of the lower case 2, so as to cover the opening in the substrate accommodating portion 21. The flange portion 51 includes pressing portions 52, and, when the inner case 5 is attached to the lower case 2, the pressing portions 52 press the light guide portions 3.

The light guide portions 3 are prevented from shaking, owing to the pressing portions 52 pressing them. The electrical circuit substrate 4 is accommodated in a space defined by the lower case 2, the inner case 5, and the light guide portions 3. The space accommodating the electrical circuit substrate 4 is configured to be dust-free.

Figure 7:
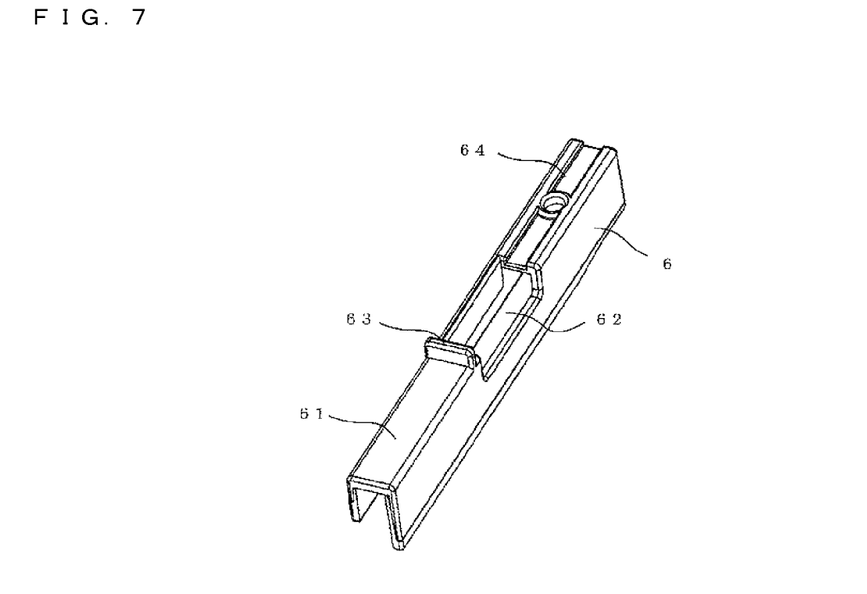
FIG. 7 is an enlarged perspective view showing an indicator lamp cover shown in FIG. 5 in a larger scale.

FIG. 7 is an enlarged perspective view showing the indicator lamp cover shown in FIG. 5 in a larger scale. The indicator lamp cover 6 is formed in a substantially U shape of a light-blocking resin material and includes a shielding portion 61, a cutaway portion 62, a projected portion 63, and a support portion 64. The indicator lamp cover 6 switches between indication and non-indication of the indicator lamps 12A to 12C by adjusting the opening degree of the opening 71. The indicator lamp cover 6 is disposed inside the case 8, so as to be slidable in the direction in which the plurality of indicator lamps 12A to 12C are arranged.

The shielding portion 61 is formed such that it can cover all the indicator lamps 12A to 12C, and at least one of the indicator lamps 12A to 12C that is covered by the shielding portion 61 is in a non-indicating state. The cutaway portion 62 is formed between the shielding portion 61 and the support portion 64.

The cutaway portion 62 is formed such that it can expose all the indicator lamps 12A to 12C, and at least one of the indicator lamps 12A to 12C exposed from the cutaway portion 62 is in an indicating state. The cutaway portion 62 in Embodiment 1 is formed so as to expose the indicator lamps 12A to 12C from two directions (i.e., the upper side and the right side in the figure). At this time, because the indicator lamps 12A to 12C are covered by the indicator lamp cover 6 at the side where the indicator lamps 12A to 12C are not exposed (i.e., the left side in the figure), the light does not come around from the side where the indicator lamps 12A to 12C are not exposed. Accordingly, in Embodiment 1, each of the indicator lamps 12A to 12C can perform reliable indication.

The projected portion 63 is formed between the shielding portion 61 and the cutaway portion 62 so as to project out of the case 8 from the opening 71. The user, using the projected portion 63, can slide the indicator lamp cover 6 to adjust the opening degree of the opening 71.

Figure 8:
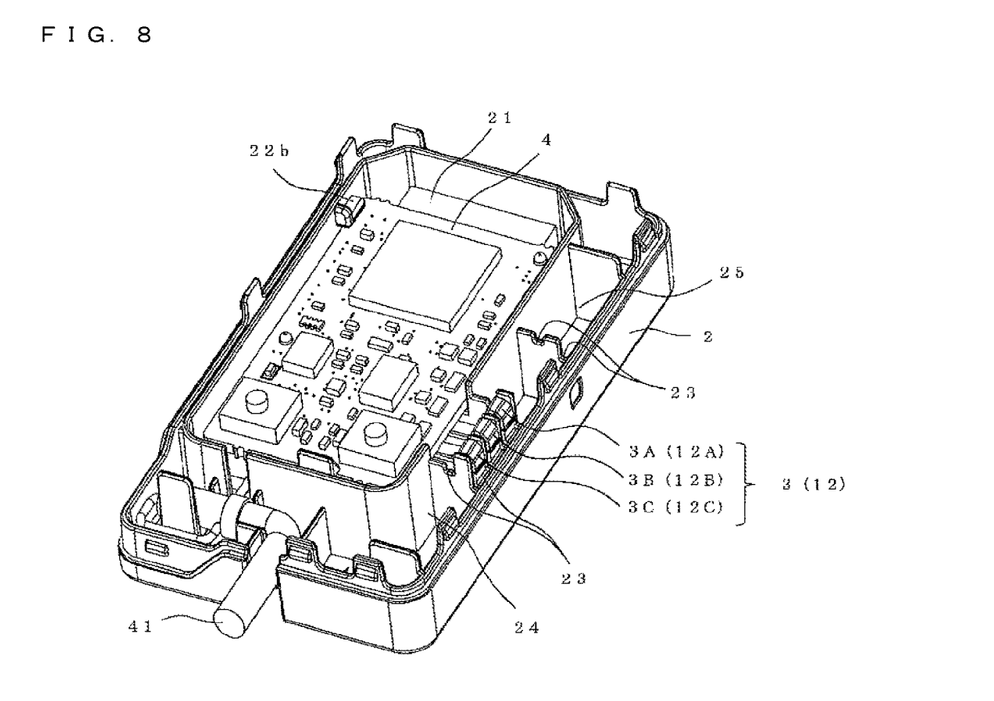
FIG. 8 is a perspective view showing a state in which light guide portions and an electrical circuit substrate are provided in a lower case.
Figure 9:
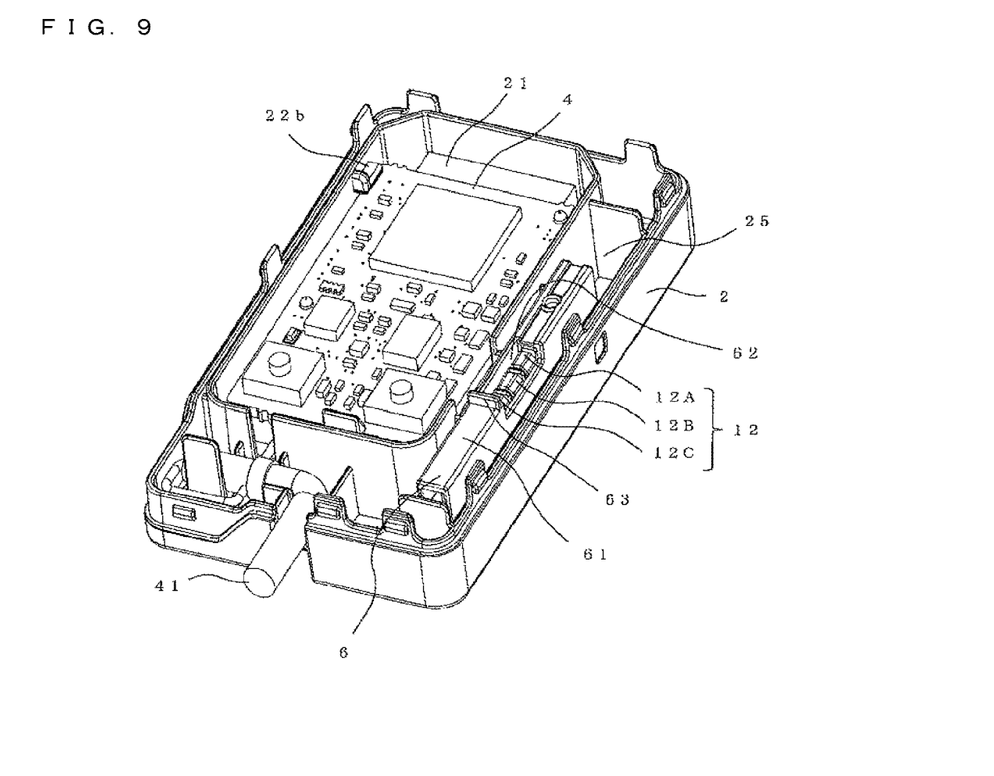
FIG. 9 is a perspective view showing a state in which the indicator lamp cover is disposed on the lower case shown in FIG. 8 in which the light guide portions and the electrical circuit substrate are provided.
Figure 10:
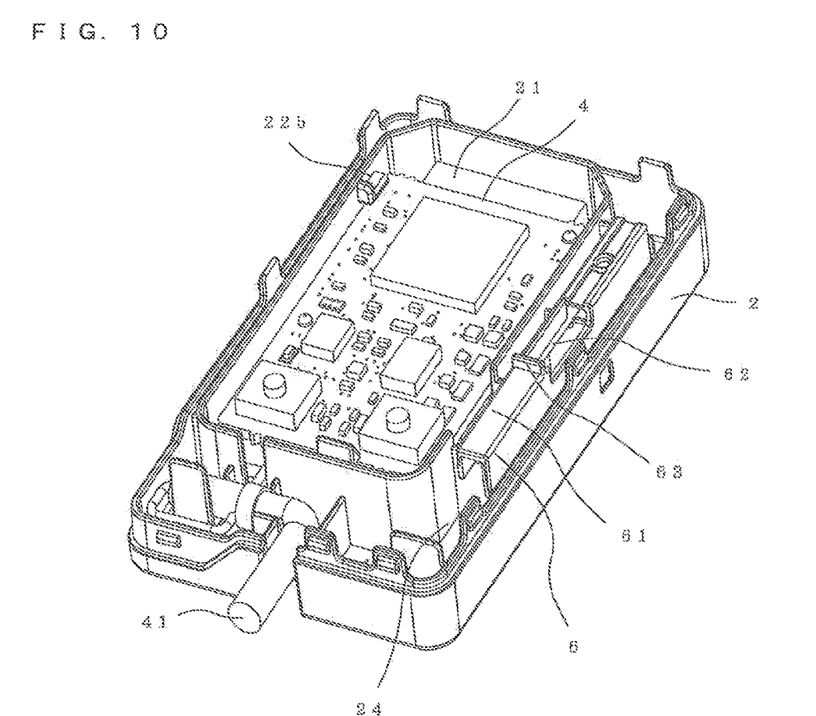
FIG. 10 is a perspective view showing a state in which the indicator lamp cover in FIG. 9 is slid.

FIG. 8 is a perspective view showing a state in which the light guide portions and the electrical circuit substrate are provided in the lower case, FIG. 9 is a perspective view showing a state in which the indicator lamp cover is disposed on the lower case shown in FIG. 8 in which the light guide portions and the electrical circuit substrate are provided, and FIG. 10 is a perspective view showing a state in which the indicator lamp cover in FIG. 9 is slid. When disposing the light guide portions 3A to 3C, the electrical circuit substrate 4, and the indicator lamp cover 6 in the lower case 2, first, the light guide portions 3A to 3C are disposed in the lower case 2, and then the electrical circuit substrate 4 is disposed. The lower case 2 and the light guide portions 3A to 3C are provided with guide portions 23 that guide the indicator lamp cover 6 in a slidable manner. The indicator lamp cover 6 is disposed on the guide portions 23 and is movable between a fully open state in which all the indicator lamps 12A to 12C are exposed (FIG. 9) and a fully closed state in which all the indicator lamps 12A to 12C are covered (FIG. 10). Note that, when the indicator lamp cover 6 is in the fully open state, the shielding portion 61 is accommodated in a shielding-portion accommodating portion 24, and when the indicator lamp cover 6 is in the fully closed state, the support portion 64 is accommodated in a support-portion accommodating portion 25.

Figure 11:
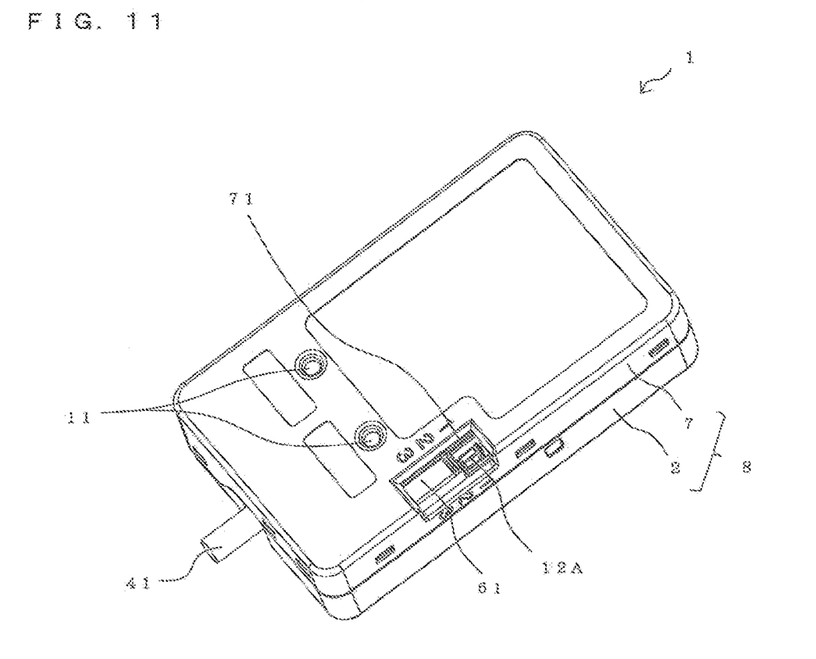
FIG. 11 is a perspective view showing a state in which the opening is partially covered by sliding the indicator lamp cover from the state in FIG. 3 (the opening is in a partially closed state).
Figure 12:
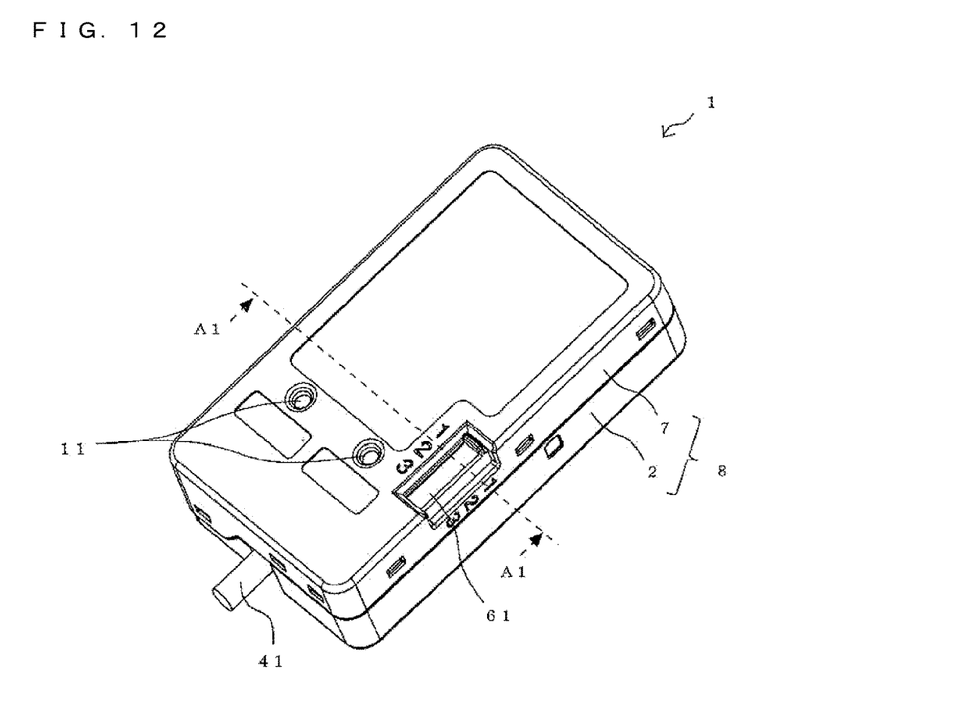
FIG. 12 is a perspective view showing a state in which the opening is entirely covered by sliding the indicator lamp cover from the state in FIG. 11 (the opening is in a fully closed state).
Figure 13:
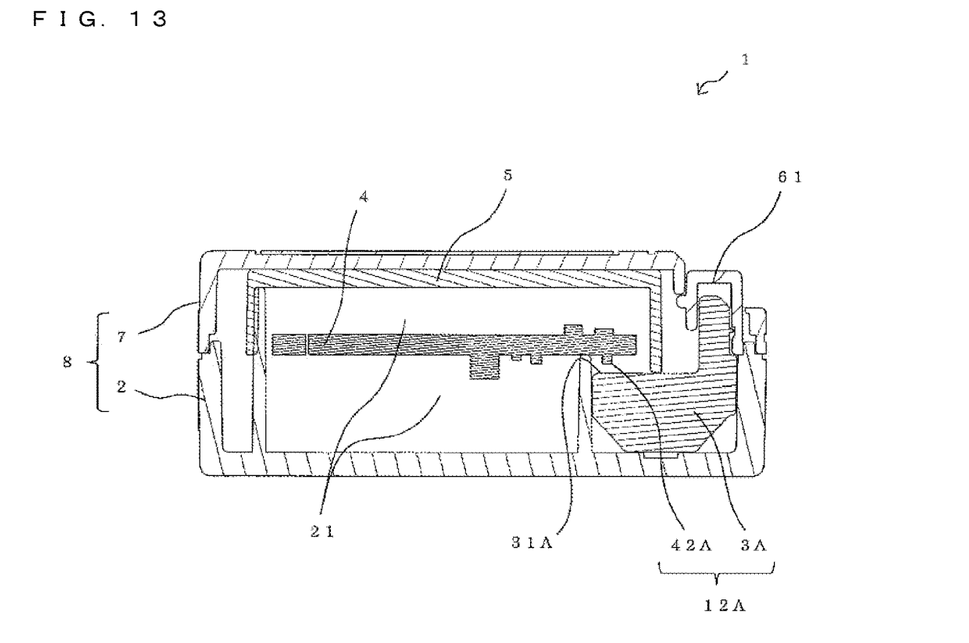
FIG. 13 is a sectional view taken along line A1-A1 in FIG. 12.

FIG. 11 is a perspective view showing a state in which the opening is partially covered by sliding the indicator lamp cover from the state in FIG. 3, FIG. 12 is a perspective view showing a state in which the opening is entirely covered by sliding the indicator lamp cover from the state in FIG. 11, and FIG. 13 is a sectional view taken along line A1-A1 in FIG. 12. The indicator lamp cover 6 is slidable in the direction in which the plurality of indicator lamps 12 are arranged. Although the plurality of indicator lamps 12A to 12C are arranged in a single straight line in Embodiment 1, the plurality of indicator lamps 12 may be arranged in two or more lines or may be arranged in a curved line. The user can switch between the indicating state and the non-indicating state of the indicator lamps 12A to 12C by sliding the indicator lamp cover 6 to adjust the opening degree of the opening 71. For example, as shown in FIG. 11, only the indicator lamp 12A is exposed, and the indicator lamps 12B and 12C are covered. Furthermore, as shown in FIG. 12, the indicator lamp cover 6 may be slid to the fully closed state so that all the indicator lamps 12A to 12C are covered. As shown in FIG. 13, because the indicator lamp 12A (12) that is covered by the indicator lamp cover 6 is not exposed from the opening 71, it is in the non-indicating state. Note that it is possible to expose the indicator lamps 12A and 12B and cover the indicator lamp 12C by adjusting the indicator lamp cover 6.

The plurality of indicator lamps 12 are arranged in such a manner that the lamp with low frequency of indication is preferentially exposed and the lamp with high frequency of indication is preferentially covered. For example, it is desirable that the plurality of indicator lamps 12 be arranged in the ascending order of frequency of indication, in the direction in which the indicator lamp cover 6 is open. In the example in Embodiment 1, the indicator lamps 12A to 12C are arranged in the order of the indicator lamp 12A, the indicator lamp 12B, and the indicator lamp 12C, in the direction in which the indicator lamp cover 6 is opened. This is because the indicator lamp 12A indicates the error status of the communication device 1, and hence, the frequency of indication thereof is low, but the necessity of indication is high. The indicator lamp 12B indicates the communication status between the communication device 1 and the air-conditioning apparatus 100, and the frequency of indication is higher than that of the indicator lamp 12A. The indicator lamp 12C indicates the communication status between the communication device 1 and the wireless LAN, and the frequency of indication is higher than those of the indicator lamps 12A and 12B.

Thus, in the example according to Embodiment 1, as shown in FIG. 11, the indicator lamp cover 6 is moved to adjust the opening degree of the opening 71 such that the indicator lamp 12A is exposed and the indicator lamps 12B and 12C are covered. As a result, in Embodiment 1, because the indicator lamps 12B and 12C with high frequencies of indication are covered, discomfort of the user is reduced. Moreover, because the indicator lamp 12A with low frequency of indication and high necessity of indication is exposed, the user can check the necessary information.

As has been described above, the communication device 1 according to Embodiment 1 is mounted to an apparatus, such as the air-conditioning apparatus 100, and required indications vary depending on the type and installation site of the apparatus, as well as the position where the communication device is disposed. In Embodiment 1, the plurality of indicator lamps 12 are arranged in the direction in which the indicator lamp cover 6 is slid. As a result, in Embodiment 1, it is possible to cover part of the plurality of indicator lamps solely by adjusting the opening degree of the indicator lamp cover 6 and to indicate the indicator lamps other than the covered indicator lamp. Accordingly, the communication device 1 according to Embodiment 1 can reduce discomfort of the user and enables the user to check the necessary information.

Moreover, in Embodiment 1, the plurality of indicator lamps 12 are arranged in such a manner that the lamp with low frequency of indication is preferentially exposed and the lamp with high frequency of indication is preferentially covered. Hence, in Embodiment 1, among the plurality of indicator lamps 12, by covering those with high frequencies of indication, disturbance to the eyes of the user can be reduced.

Furthermore, in Embodiment 1, because the projected portion 63 is projected out of the case 8, the user can easily adjust the opening degree of the opening 71 by using the projected portion 63. The communication device 1 according to Embodiment 1 is to be mounted to an apparatus, such as the air-conditioning apparatus 100, and it may sometimes be disposed such that the indicator lamps 12 face a direction in which they are unnoticeable. In such a case, sliding the indicator lamp cover 6 may be difficult. However, in Embodiment 1, because the indicator lamp cover 6 can be slid by using the projected portion 63 that projects out of the case 8, it is easy to adjust the opening degree of the opening 71. Furthermore, in Embodiment 1, because the projected portion 63 of the indicator lamp cover 6 is formed between the shielding portion 61 and the cutaway portion 62, when the opening 71 is turned to the fully open state or to the fully closed state, the projected portion 63 comes into contact with an end of the opening 71, restricting the moving range of the indicator lamp cover 6.

Furthermore, in Embodiment 1, the indicator lamps 12 each include the light guide portion 3 and the light-emitting portion 42, and the light guide portion 3 and the light-emitting portion 42 are disposed away from each other. Because the indicator lamps 12 are exposed from the opening 71, the user may contact the indicator lamps 12 with fingers when sliding the indicator lamp cover 6. Even in such a case, in Embodiment 1, because the light-emitting portion 42 and the light guide portion 3 are disposed away from each other, the risk of stress being applied to the light-emitting portion 42 and the electrical circuit substrate 4 on which the light-emitting portion 42 is disposed, damaging them, is reduced. Moreover, in Embodiment 1, because the light-emitting portion 42 and the light guide portions 3 are away from each other, heat from the light-emitting portion 42 is not directly conducted to the light guide portions 3 and the case 8.

The present invention is not limited to Embodiment 1 described above, but may be variously modified within a scope of the present invention. That is, the configuration of Embodiment 1 described above may be appropriately improved, or at least part of the configuration may be replaced by another configuration. Moreover, the components whose positions are not specifically limited may be disposed at any position so long as they can fulfill their functions, regardless of the positions disclosed in Embodiment 1.

For example, a configuration that includes a step change mechanism (not shown) that in a stepwise manner changes the indication and non-indication of the plurality of indicator lamps 12 is also possible. The step change mechanism in a stepwise manner adjusts the opening degree of the opening 71 and is formed of, for example, a projection that is formed on one of the indicator lamp cover 6, which is a moving part, and the lower case 2, which is a fixed part, and a groove formed in the other. By providing the step change mechanism, the opening degree of the opening 71 may be appropriately adjusted, thereby enabling each of the plurality of indicator lamps 12 to be appropriately indicated.

Furthermore, although the configuration in which the indicator lamp cover 6 is closed toward a direction opposite to the direction of gravity has been described above, for example, the indicator lamp cover 6 may be configured to be closed toward the direction of gravity. With such a configuring, when the indicator lamp cover 6 is closed due to the effect of gravity, the indicator lamps 12 do not disturb the eyes.

REFERENCE SIGNS LIST 1 communication device, 2 lower case, 3 light guide portion, 3A light guide portion, 3B light guide portion, 3C light guide portion, 4 electrical circuit substrate, 5 inner case, 6 indicator lamp cover, 7 upper case, 8 case, 11 manipulating portion, 12 indicator lamp, 12A indicator lamp, 12B indicator lamp, 12C indicator lamp, 21 substrate accommodating portion, 21a inner wall, 21b carry portion, 21c projection, 22 communication portion, 23 guide portion, 24 shielding-portion accommodating portion, 25 support-portion accommodating portion, 31A light entering portion, 32A lighting portion, 41 connecting cable, 42 light-emitting portion, 42A light-emitting portion, 42B light-emitting portion, 42C light-emitting portion, 51 flange portion, 52 pressing portion, 61 shielding portion, 62 cutaway portion, 63 projected portion, 64 support portion, 71 opening, 100 air-conditioning apparatus, 102 air inlet, 104 air outlet, 106 detection unit, 200 LAN, 300 terminal, and 400 other apparatuses.

The invention claimed is:

1. A communication device that constitutes part of an apparatus and communicates with another apparatus, the communication device comprising:
   a case;
   a plurality of indicator lamps accommodated in the case, at a position corresponding to a single opening formed in the case; and
   an indicator lamp cover provided slidably in a direction in which the indicator lamps are arranged and being used to adjust an opening degree of the opening, wherein
   the indicator lamps are arranged adjacent to one another so that the indicator lamp cover covers the indicator lamps in series as the indicator lamp cover slides toward a fully closed state from a fully open state,
   the indicator lamp cover covers at least one of the indicator lamps in a partially closed state in which the opening degree is between the fully open state and the fully closed state and allows the indicator lamps other than the indicator lamp covered by the indicator lamp cover to be exposed,
   the plurality of indicator lamps includes a less-frequent indicator lamp that displays an indication relatively less-frequently and a more-frequent indicator lamp that displays an indication relatively more-frequently than that of the less-frequent indicator lamp, and
   the indicator lamp cover covers the more-frequent indicator lamp and allows the less-frequent indicator lamp to be exposed in the partially closed state.

2. The communication device of claim 1, wherein at least one of the indicator lamps indicates a communication status of the communication device.

3. The communication device of claim 1, wherein the indicator lamps are arranged in an ascending order of frequency of indication, in a direction in which the indicator lamp cover is opened.

4. The communication device of claim 1, wherein the indicator lamp cover includes a projected portion that is projected to an outside of the case.

5. The communication device of claim 1,
   wherein each of the indicator lamps includes a light-emitting portion and a light guide portion,
   wherein the light-emitting portion emits light to the light guide portion, and
   wherein the light guide portion is disposed apart from the light-emitting portion and guides the light emitted from the light-emitting portion to the opening.

6. The communication device of claim 5,
   wherein the case includes an accommodating portion that accommodates the light-emitting portion, and a communication portion that communicates between the accommodating portion and the opening, and
   wherein the light guide portion is disposed in the communication portion and guides the light emitted from the light-emitting portion accommodated in the accommodating portion to the opening.

7. An air-conditioning apparatus comprising the communication device of claim 1, wherein the indicator lamps emit light in a direction different from a direction in which air is blown out of the air-conditioning apparatus.

8. The air-conditioning apparatus of claim 7, wherein the communication device is disposed on a side surface, at a position near a back surface of the air-conditioning apparatus.

9. A communication device that constitutes part of an apparatus and communicates with another apparatus, the communication device comprising:
   a case;
   a plurality of indicator lamps accommodated in the case, at a position corresponding to a single opening formed in the case; and
   an indicator lamp cover provided slidably in a direction in which the indicator lamps are arranged and being used to adjust an opening degree of the opening, wherein
   the indicator lamps are arranged adjacent to one another so that the indicator lamp cover covers the indicator lamps in series as the indicator lamp cover slides toward a fully closed state from a fully open state, and
   wherein the indicator lamps are arranged in an ascending order of frequency of indication, in a direction in which the indicator lamp cover is opened.

10. The communication device of claim 9, wherein at least one of the indicator lamps indicates a communication status of the communication device.

11. The communication device of claim 9, wherein the indicator lamp cover includes a projected portion that is projected to an outside of the case.

12. The communication device of claim 9,
   wherein each of the indicator lamps includes a light-emitting portion and a light guide portion,
   wherein the light-emitting portion emits light to the light guide portion, and
   wherein the light guide portion is disposed apart from the light-emitting portion and guides the light emitted from the light-emitting portion to the opening.

13. The communication device of claim 12,
wherein the case includes an accommodating portion that accommodates the light-emitting portion, and a communication portion that communicates between the accommodating portion and the opening, and
wherein the light guide portion is disposed in the communication portion and guides the light emitted from the light-emitting portion accommodated in the accommodating portion to the opening.

14. An air-conditioning apparatus comprising the communication device of claim 9, wherein the indicator lamps emit light in a direction different from a direction in which air is blown out of the air-conditioning apparatus.

15. The air-conditioning apparatus of claim 14, wherein the communication device is disposed on a side surface, at a position near a back surface of the air-conditioning apparatus.

* * * * *